(12) United States Patent
Stevens

(10) Patent No.: US 8,014,671 B1
(45) Date of Patent: Sep. 6, 2011

(54) WAVELENGTH DIVISION MULTIPLEXED OPTICAL CHANNEL SWITCHING

(75) Inventor: Rick C. Stevens, Apple Valley, MN (US)

(73) Assignee: Lockheed Martin Corporation, Bethesda, MD (US)

(*) Notice: Subject to any disclaimer, the term of this patent is extended or adjusted under 35 U.S.C. 154(b) by 988 days.

(21) Appl. No.: 11/331,770

(22) Filed: Jan. 13, 2006

(51) Int. Cl.
*H04B 10/20* (2006.01)

(52) U.S. Cl. .......................................... 398/69; 398/165

(58) Field of Classification Search .................. 398/58, 398/54, 51, 79, 1, 9, 45, 67–73
See application file for complete search history.

(56) References Cited

U.S. PATENT DOCUMENTS

| | | | | |
|---|---|---|---|---|
| 5,289,302 A * | 2/1994 | Eda | | 398/51 |
| 5,369,515 A * | 11/1994 | Majima | | 398/59 |
| 5,369,516 A * | 11/1994 | Uchida | | 398/60 |
| 5,404,241 A * | 4/1995 | Ota | | 398/63 |
| 5,561,542 A * | 10/1996 | Kosugi et al. | | 398/58 |
| 5,602,663 A * | 2/1997 | Hamaguchi et al. | | 398/79 |
| 5,604,748 A * | 2/1997 | Date et al. | | 370/449 |
| 5,777,762 A * | 7/1998 | Yamamoto | | 398/51 |
| 5,854,699 A * | 12/1998 | Olshansky | | 398/79 |
| 5,930,014 A * | 7/1999 | Yamamoto | | 398/58 |
| 5,933,261 A * | 8/1999 | Fukui et al. | | 398/14 |
| 6,009,490 A * | 12/1999 | Fukui et al. | | 710/113 |
| 6,032,185 A * | 2/2000 | Asano | | 709/227 |
| 6,195,186 B1 * | 2/2001 | Asahi | | 398/5 |
| 6,339,598 B1 * | 1/2002 | Thomas et al. | | 370/442 |
| 6,377,725 B1 * | 4/2002 | Stevens et al. | | 385/24 |
| 6,411,418 B1 * | 6/2002 | Deri et al. | | 398/182 |
| 6,956,996 B2 * | 10/2005 | Gordon et al. | | 385/48 |
| 7,046,621 B2 * | 5/2006 | Wang et al. | | 370/222 |
| 7,349,629 B1 * | 3/2008 | Soderberg et al. | | 398/60 |
| 7,360,002 B2 * | 4/2008 | Brueckner et al. | | 710/120 |
| 2002/0015200 A1 * | 2/2002 | Jennings et al. | | 359/124 |
| 2002/0061162 A1 * | 5/2002 | Okayama | | 385/24 |
| 2002/0093677 A1 * | 7/2002 | Ozeki et al. | | 358/1.15 |
| 2002/0101874 A1 * | 8/2002 | Whittaker et al. | | 370/402 |
| 2002/0186430 A1 * | 12/2002 | Halgren et al. | | 359/124 |
| 2003/0093530 A1 * | 5/2003 | Syed | | 709/226 |
| 2004/0252682 A1 * | 12/2004 | Brueckner et al. | | 370/362 |

FOREIGN PATENT DOCUMENTS

WO 2005/015798 A1 2/2005

OTHER PUBLICATIONS

Bidirectional communications. (1999). In Focal Dictionary of Telecommunications, Focal Press. Retrieved from http://www.credoreference.com/entry/bhfidt/bidirectional_communications.*
Reichmeyer et al., "An Optical Network Interface Unit for Multichannel Ring Networks," Network Protocols, 1993. Proceedings., 1993 International Conference for IEEE, San Francisco, CA, Oct. 19-22, 1993, pp. 308-315.

* cited by examiner

*Primary Examiner* — Ken Vanderpuye
*Assistant Examiner* — Danny Leung
(74) *Attorney, Agent, or Firm* — Mueting, Raasch & Gebhardt, P.A.

(57) ABSTRACT

An optical communication system and method for use in communicating data between nodes using wavelength division multiplexing includes an optical backbone to provide an optical pathway between the nodes. Arbitration information on a dedicated arbitration wavelength transmitted during an arbitration cycle is used by the plurality of nodes to select one of a plurality of wavelengths at which to transmit data during a subsequent data cycle.

19 Claims, 8 Drawing Sheets

WAVELENGTH DIVISION MULTIPLEXED OPTICAL CHANNEL SWITCHING

BACKGROUND OF THE INVENTION

The present invention relates generally to communication systems and methods, and more particularly to optical communication systems and methods. Further, more specifically, the present invention pertains to optical communication systems and methods that employ wavelength division multiplexing.

Optical fiber has been widely accepted as an interconnection medium for communication networks, due mainly to the advantages offered by fiber, such as higher bandwidths and better noise performance, as compared to electrical media. Multi-channel optical networks allow several users to access the fiber simultaneously, thus increasing the overall network capacity. The optical bandwidth may be divided into several channels, each capable of transmitting non-interfering signals at distinct wavelengths, or in other words, wavelength division multiplexed (WDM).

Such an optical network can be used to optically connect any number of nodes having optical transceivers associated therewith. For example, an optical interconnect can be used to connect a plurality of processors for interprocessor communication (e.g., the communication of packets between one or more processor nodes of a network, such as a ring network, or a linear tapped bus network).

Switches used for such optical interconnect are generally constructed to operate as either a connection oriented or a connectionless oriented interconnect. In the case of a connection oriented interconnect, the switch connections between inputs and outputs are established by the user and the connections will remain until the user changes them. Therefore, they are considered connection oriented. The connection establishment commands by the user determine how input information is routed. In the case of a connectionless oriented switch, there are no connection establishment commands by a user. Instead, as each message is sent to the switch, header information associated with the message is read and the destination determined. In other words, the switch becomes responsible for the proper routing. Each message is self-routed, and is therefore, the switch is connectionless.

The optical fibers of at least certain conventional optical interconnects are coupled to the nodes of the network (e.g., processor nodes) through optical to electrical interfaces (e.g., optical transceivers), and interconnected generally at a centralized switch to accomplished desired routing of information. The centralized switch (e.g., a connectionless switch), for example, receives from the processor nodes (e.g., transmission nodes) information packets in the form of optical signals. The external central switch converts the optical signals to electrical signals, decodes the packet header to determine the destination node or nodes (e.g., processor node) for the information, converts the electrical signals back to optical signals, and routes the optical signals to the proper destination processor node.

In other words, generally, such conventional (e.g., connectionless) optical switches include optical-electrical-optical (OEO) design architectures. These architectures provide packet self-routing which is necessary for multiprocessing systems. However, the brute force method of optical to electrical, and thereafter, electrical to optical conversion, has a number of disadvantages. For example, considerable energy is dedicated to the optical to electrical and electrical to optical conversions, leading to higher power implementation. Further, for example, there is also an increase in the number of components because of the dedication of circuitry to perform the optical to electrical and electrical to optical conversion.

Due to the high module density, complex packaging, and higher power implementation of such OEO designs, reliability is negatively affected. Yet further, there is also a higher cost as a result of the high module density, complex packaging, and high power requirements. Still further, because all the optical fibers are routed to a centralized (e.g., external to the nodes) switch, a single point of failure for the optical network exists at the switch. The switch module may also need to be redesigned on an ongoing basis each time the data rate or data communication protocol changes.

SUMMARY OF THE INVENTION

In one or more embodiments, the present invention provides for the elimination of such an external central switch function (e.g., a centralized switch function that requires optical to electrical and electrical to optical conversions) by utilizing the multi-channel capability of a wavelength division multiplexed (WDM) optical interconnect and a distributed wavelength selection function. For example, in one or more embodiments, a distributed wavelength selection function may be part of a network interface unit (NIU) of each node.

Elimination of the OEO switch from designs may enable a system to have one or more of the following advantages: lower weight, smaller volume, higher fault tolerance, elimination of single point of failure of a centralized switch, lower power requirements, lower cost, and higher reliability. Further, improved information (e.g., packetized messages) passing performance may be accomplished according to the present invention because the nodes in a decentralized manner decide which information is to be transmitted and/or received at the various nodes of the network.

An optical communication system for use in communicating data between a plurality of nodes using wavelength division multiplexing according to the present invention includes an optical backbone (e.g., bidirectional optical backbone) to provide an optical pathway between the plurality of nodes and a plurality of network interface units. Each network interface unit associated with a corresponding node of the plurality of nodes includes an arbitration optical transmitter operable to transmit arbitration information on the optical pathway at an arbitration wavelength during an arbitration cycle representative of at least a request to write data to or read data from another node of the plurality of nodes and an arbitration optical receiver tuned to the arbitration wavelength to receive transmitted arbitration information from the optical pathway during an arbitration cycle from one or more of the plurality of nodes.

Each network interface unit further includes a data optical transmitter tunable to a plurality of wavelengths for use in transmitting data on the optical pathway to another node of the plurality of nodes (e.g., the plurality of wavelengths being different than the arbitration wavelength) and a data optical receiver tunable to one of the plurality of wavelengths for use in receiving data from the optical pathway (e.g., each of the data optical receivers may be tuned and set to a different designated data receive wavelength). Yet further, an arbitration selection apparatus of each network interface unit (e.g., substantially identical selection logic, including, for example, a lookup table, for determining priority for transmission of data amongst the plurality of nodes) is operable to analyze the transmitted arbitration information from a plurality of nodes and select a wavelength of the plurality of wavelengths at which to transmit data to another node during a data cycle.

In one embodiment, the arbitration cycles run concurrently with data cycles with the arbitration information from each arbitration cycle being used to control data transmission in a data cycle subsequent to the arbitration cycle.

In another embodiment, the arbitration information from each of a plurality of arbitration optical transmitters associated with a plurality of nodes is time division multiplexed at the arbitration wavelength during the arbitration cycle.

Still further, in at least one embodiment, each arbitration optical transmitter is operable to transmit arbitration information on the optical pathway at the arbitration wavelength during an arbitration cycle (e.g., the arbitration information being time division multiplexed during the arbitration cycle) representative of a request to write data to or read data from another node of the plurality of nodes and also transmit arbitration information on the optical pathway at the arbitration wavelength during the arbitration cycle (e.g., the arbitration information being time division multiplexed during the arbitration cycle) representative of a grant of a request to write data to or read data from another node of the plurality of nodes.

In another embodiment of the system, each arbitration optical transmitter is operable to transmit arbitration information on the optical pathway at the arbitration wavelength during an arbitration cycle representative of a request to write data to or read data from another node of the plurality of nodes and also transmit arbitration information on the optical pathway at the arbitration wavelength during the arbitration cycle representative of a confirmation of the data read or write at the plurality of nodes.

A switching method for use in optically communicating data between a plurality of nodes according to the present invention is also described in which data is communicated between the plurality of nodes using wavelength division multiplexing. The method includes transmitting arbitration information, from each node of a plurality of nodes, at an arbitration wavelength during an arbitration cycle representative of at least a request to write data to or read data from another node of the plurality of nodes and receiving the transmitted arbitration information at each node during the arbitration cycle from the plurality of nodes. At each of one or more of the plurality of nodes, a transmission wavelength of a plurality of wavelengths is selected at which to transmit data to one or more other nodes based on the transmitted arbitration information (e.g., the plurality of wavelengths being different than the arbitration wavelength). The method further includes transmitting data, from each of one or more nodes to another node of the plurality of nodes, at a selected transmission wavelength during a data cycle and receiving transmitted data at each of one or more nodes tuned to a selected transmission wavelength.

One or more embodiments of the method may include one or more of the above summarized features and/or one or more of the following features: arbitration cycles that run concurrently with data cycles; arbitration information from each arbitration cycle being used to control data transmission in a data cycle subsequent to the arbitration cycle; time division multiplexing arbitration information from each node of a plurality of nodes at the arbitration wavelength during an arbitration cycle; transmitting arbitration information at the arbitration wavelength during an arbitration cycle representative of a request to write data to or read data from another node of the plurality of nodes; transmitting arbitration information at the arbitration wavelength during an arbitration cycle representative of a grant of a request to write data to or read data from another node of the plurality of nodes; time division multiplexing arbitration information from each of a plurality of nodes at the arbitration wavelength during an arbitration cycle; transmitting arbitration information at the arbitration wavelength during the arbitration cycle representative of a confirmation of the data read or write at the plurality of nodes; tuning and setting a data optical receiver associated with each node to a designated data receive wavelength of the plurality of wavelengths; and analyzing the transmitted arbitration information using selection logic substantially identical at each node for determining priority for transmission of data amongst the plurality of nodes.

Another optical communication system for use in communicating data between a plurality of nodes using wavelength division multiplexing according to the present invention includes an optical backbone to provide an optical pathway between the plurality of nodes. Arbitration optical transmitter components, at each node, are operable to transmit arbitration information on the optical pathway at an arbitration wavelength during an arbitration cycle (e.g., time division multiplexed information) representative of at least a request to write data to or read data from another node of the plurality of nodes. Arbitration optical receiver components, at each node, tuned to the arbitration wavelength are operable to receive transmitted arbitration information from the optical pathway during the arbitration cycle from one or more of the plurality of nodes. Data optical transmitter components tunable to a plurality of wavelengths are operable to transmit data on the optical pathway to another node of the plurality of nodes (e.g., the plurality of wavelengths being different than the arbitration wavelength) and data optical receiver components tunable to one of the plurality of wavelengths are operable for use in receiving data from the optical pathway. Selection circuitry is operable to analyze the transmitted arbitration information from a plurality of nodes and select a wavelength of the plurality of wavelengths at which to transmit data to another node during a data cycle.

The above summary of the present invention is not intended to describe each embodiment or every implementation of the present invention. Advantages, together with a more complete understanding of the invention, will become apparent and appreciated by referring to the following detailed description and claims taken in conjunction with the accompanying drawings.

DETAILED DESCRIPTION OF THE EMBODIMENTS

Generally, an optical communication system 10, according to the present invention, shall be described with reference to FIG. 1. One or more embodiments of the optical communication system and components thereof, along with methods associated with the operation of the optical communication system, shall further be described in more detail with reference to FIGS. 2-4.

Generally, and as further described herein, optical communication system 10 (e.g., a linear tapped bus) includes a plurality of nodes 14 (e.g., processor nodes) associated with corresponding network interface units (NIUs) 12 (e.g., NIUs connected via input/output to associated processor components). Although FIG. 1 shows network interface units NIU0 through NIU3, it will be readily apparent that any number of NIUs 12 may be used to interface any number of associated nodes 14 to optical backbone 20 of the optical communication system 10. Further, although a linear tapped bus configuration is shown, the present invention may be applied to various other network architectures, such as, ring, linear, dual counter rotating rings, star, tree, layered, etc.

Each of the network interface units (NIU0-NIU3) include corresponding arbitration components 40-43, respectively, and further include corresponding data components 50-53, respectively. The network interface units 12 are operable for transmitting optical signals onto optical backbone 20 of the optical communication system 10, and are further operable for receiving optical signals from optical backbone 20 using various optical components 30-33 associated with the plurality of network interface units (NIU0-NIU3), respectively.

Figure 1:
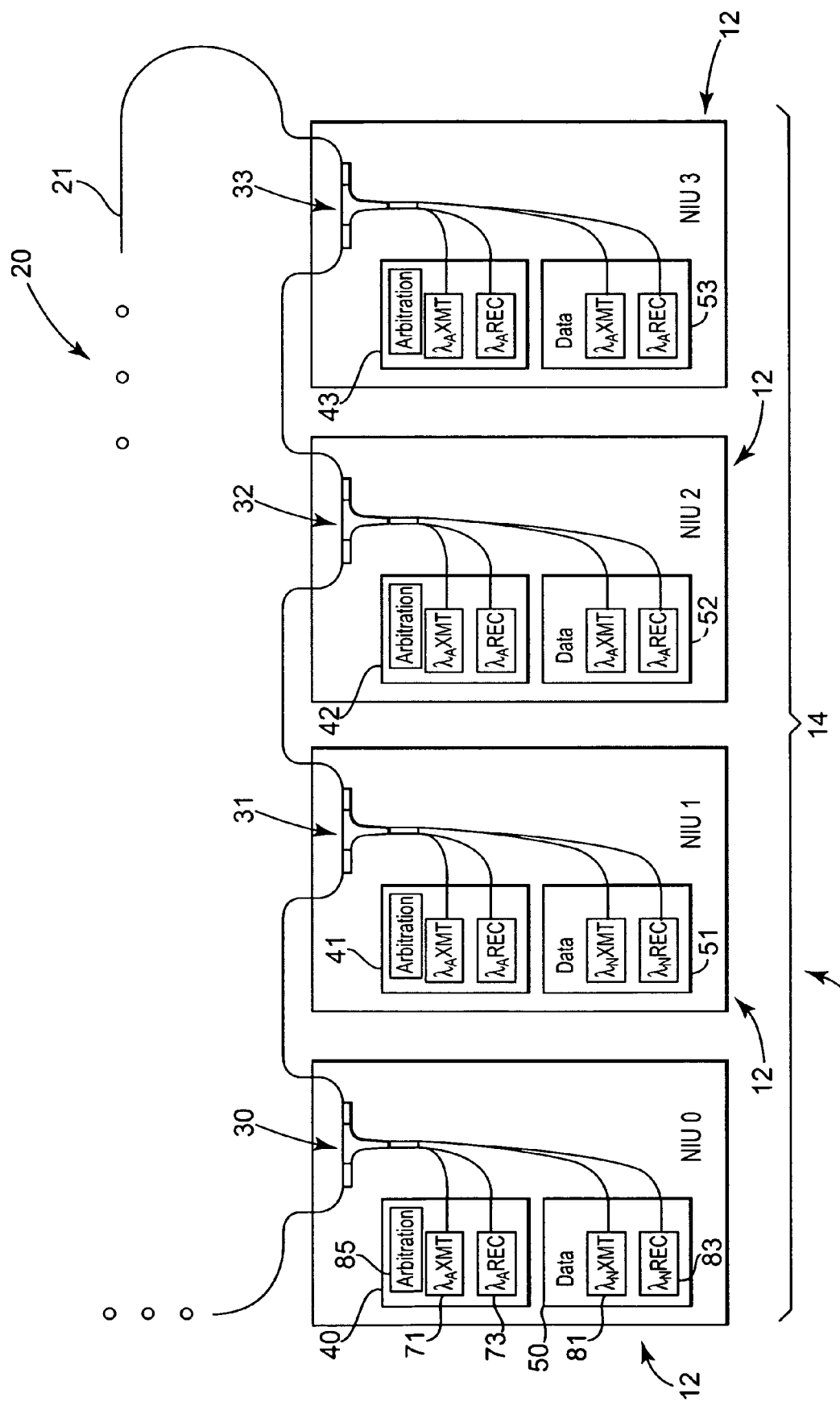
FIG. 1 shows an exemplary optical communication system according to the present invention including a plurality of network interface units.

Optical backbone 20, as shown in FIG. 1, is representative of a bidirectional optical topology where optical signal is transported over a single optical fiber 21 between nodes 14 with which network interface units 12 are associated. Optical components 30-33 may include any optical components suitable for use in implementing the bidirectional optical backbone 20. For example, such components may include combiners, splitters, optical circulators, couplers, amplifiers, switches, add-drop filters, multiplexers, demultiplexers, isolators, or any other optical components suitable for use in such optical interconnects for transmission of optical signals from the network interface units onto the optical backbone 20, and further for receiving optical signals at the network interface units 12 from the optical backbone 20.

Further, as shown in FIG. 1, the optical backbone 20 employs wavelength division multiplexing. In other words, the optical bandwidth is divided into several channels, each capable of transmitting non-interfering signals at distinct wavelengths over the optical fiber or fibers of the system 10.

It is also observed that, although the exemplary embodiment shown in FIG. 1 includes a bidirectional topology, the optical communication system 10 may further be provided using a unidirectional optical backbone topology, wherein multiple fibers are used with each fiber supporting one direction of traffic. In other words, one will recognize that various topologies may be used for the optical backbone 20 in accordance with the present invention and that the present invention is not limited to any particular topology, although one topology may be advantageous over others.

As the present invention may be utilized with various optical backbone topologies, description with respect to the optical components (e.g., such as those described herein for the bidirectional optical backbone) and/or the number of optical fibers utilized for such topologies shall not be provided in further detail. One will recognize that the optical components 30-33, respectively, provided for the network interface units 12 and the number of optical fibers provided for transportation of optical signal will be dependent upon desired applications and the topology of the optical backbone 20 (e.g., bidirectional or unidirectional optical interconnect).

In general, and at least in one exemplary embodiment of the present invention, the optical communication system 10 operates to transport packets of data between the network interface units 12 associated with respective nodes 14 on the optical backbone 20. Such communication of data (e.g., packetized data) is carried out during a plurality of cycles (e.g., periodic time periods).

In at least one embodiment, two concurrent cycles are employed. The two concurrent cycles, which at least in one embodiment fall within a same time period or cycle time, include data cycles and arbitration cycles (see description with reference to FIGS. 3A-3B).

An arbitration cycle (e.g., a current arbitration cycle) preferably determines the switch interconnects for the next data cycle. In other words, arbitration information in a particular arbitration cycle is used by the network interface units 12 to determine the operation or operations to take place in a subsequent data cycle (e.g., switch which nodes transmit information to which nodes for routing of information between the plurality of nodes 14). As further described herein, at least in one embodiment, the arbitration cycles and the data cycles can overlap since the arbitration cycle is transmitted and received using a time division multiplexed (TDM) separate dedicated optical wavelength.

Further, generally, at least in one embodiment, each network interface unit 12 associated with a node 14 on the WDM optical backbone 20 monitors the arbitration wavelength and inserts during a node's respective assigned TDM time slot arbitration information representative of at least a request to write data to or read data from another node of the plurality of nodes 14 during at least a request portion of the arbitration cycle. Optionally, at least in one embodiment, the arbitration cycle may also include a TDM grant portion for arbitration information representative of a grant of a request to read data to and/or write data from another node of the plurality of nodes. In other words, during the grant portion of the arbitration cycle, each node may insert during an assigned respective TDM time slot information representative of which requesting node it will receive a message from. In other words, each node can therefore determine their own priority when multiple nodes are requesting access, at least in one particular embodiment of the present invention.

Further, at least in one embodiment, after the arbitration cycle is completed, each of the plurality of nodes 14 selected to participate in a message packet transfer during a subsequent data cycle will then select an optical wavelength to utilize during the data cycle. For example, the transmitting node may tune a laser transmitter to an appropriate wavelength, and the receiving node and/or nodes may tune their wavelength filter to an appropriate wavelength for receiving information. Such a system may provide an efficient mechanism for either broadcast and/or multicast messages (e.g., multiple nodes may tune to the same receive wavelength to receive the same information from a single transmitting node, or in other words, a single transmitting node may broadcast the same information to multiple nodes).

As previously indicated, each of the NIUs 12 of the optical communication system 10 associated with each node 14 includes arbitration components 40 and data components 50. The arbitration components 40 include at least an arbitration optical transmitter 71 operable to transmit arbitration information on the optical pathway (e.g., optical backbone 20) of the optical communication system 10 at an arbitration wavelength ($\lambda_A$) during an arbitration cycle representative of at least a request to write data to or read data from another node of the plurality of nodes 14 of the optical communication system 10. Yet further, the arbitration components 40 include an arbitration optical receiver 73 tuned to the arbitration wavelength ($\lambda_A$) to receive transmitted arbitration information from the optical pathway (e.g., optical fiber 21 via optical components 30) during an arbitration cycle from one or more of the plurality of nodes 14.

The data components 50 include at least a data optical transmitter 81 tunable to one of a plurality of wavelengths ($\lambda_0$-$\lambda_N$) for use in transmitting data on the optical pathway to another node (or nodes) of the plurality of nodes 14. The plurality of wavelengths ($\lambda_0$-$\lambda_N$) to which the data optical transmitter 81 associated with the network interface unit 12 may be tuned are different than the arbitration wavelength ($\lambda_A$). In other words, the arbitration wavelength ($\lambda_A$) is a separate dedicated optical wavelength that is multiplexed with the plurality of data wavelengths ($\lambda_0$-$\lambda_N$) during cycles of operation. Further, the data components 50 of network interface unit 12 include a data optical receiver 83 tunable to one of the plurality of wavelengths ($\lambda_0$-$\lambda_N$) for use in receiving data from the optical pathway (e.g., optical fibers 21 and data components 30).

Arbitration components 40 further include an arbitration selection apparatus 85 that is operable to analyze the transmitted arbitration information received from a plurality of nodes (e.g., via optical receiver 73 tuned to arbitration wavelength ($\lambda_A$)) and select a wavelength at which to transmit data to another node of the plurality of nodes 14 during a data cycle. One skilled in the art will recognize that the arbitration selection apparatus 85 may take any number of different forms and may be implemented in any number of different manners.

For example, the arbitration selection apparatus 85 may include the use of one or more of the following to implement the analysis of the transmitted arbitration information and provide instructions to the appropriate components of the respective network interface unit 12. For example, a look-up table may be used in the analysis of the arbitration information and to provide information regarding transmission of information during a subsequent data cycle (e.g., a look-up table that includes priority information applicable to the plurality of nodes). Further, for example, selection logic implemented in any known manner may be used to perform the analysis and/or request and/or grant requests as necessary to carry out the functionality of the present invention (e.g., for determining priority for transmission of data amongst the plurality of nodes).

For consistency and ease of operation, as well as cost effectiveness, the arbitration selection apparatus 85 according to the present invention is implemented in substantially the same manner at each network interface unit 12 associated with the respective plurality of nodes 14 of the optical communication system 10. For example, the same look-up table may be used at each of the plurality of nodes 14 that is usable for determining priority amongst the plurality of nodes.

However, one will recognize that such an arbitration selection apparatus may also be different amongst the plurality of nodes 14. Such different arbitration selection apparatus may be useful in various circumstances. For example, it may be useful when a number of subsystems receive the same message but have a different priority associated with this particular message (e.g., where messages that are placed on an output to a node will have a different set of priorities depending on the particular node). Although priorities are generally based on minimizing switch congestion or input buffer congestion, the difference in priority may be on based the particular subsystem and its associated responsibility. For example, aircraft position information for many subsystems is used as general information or for logging events. However, for a weapons subsystem that is passing a location to a geo-location based weapon, this same aircraft position information is a high priority message that needs to be received with minimal latency.

One will recognize that description of components for only NIU0 is provided herein as the other NIUs are substantially similar in many cases to NIU0. As such, description for the other NIUs is limited for simplicity purposes.

The optical transmitters and receivers of the arbitration components 40 and data components 50 of each network interface unit 12 associated with the respective plurality of nodes 14 may include any suitable optical transmitter and receiver configuration for operation with optical backbone 20. For example, such optical transmitters and receivers may be a standardized electrical optical transceiver, such as those used for commercial interfaces like Gigabit Ethernet, Fiber Channel, RapidIO, etc.

Further, for example, an electrical optical transceiver is assumed to be available, each having a mechanical and electrical connection structure, for operation according to the present invention in the optical communication system 10. Generally, transceivers have an optical side thereof, an optical input and an optical output, accessible via respective connectors adapted to receive complementary standard optical connectors. For example, the optical connectors may be mounted at the ends of optical fiber cables. Further, for example, generally the transceivers have an electrical side thereof, an electrical input and an electrical output, accessible via matching complementary electrical connectors that can be coupled to other electrical components.

Further, in general, the transceivers have two internal signal paths, a first path from the optical input to the electrical output, and a second path from the electrical input to the optical output. In the first path, an optical signal, received at the optical input, is first converted into a corresponding electrical signal. The optical input supplies the received optical signal, particularly one of the component optical signals of a wavelength division multiplexed signal, to a photo detector that converts the component optical signal into a corresponding electrical signal. The electrical signal is then fed to the electrical circuitry (e.g., an amplifier for adapting electrical signal to other circuitry, components for filtering, etc.). The electrical signal is routed, as necessary, for carrying out functionality according to the present invention.

In the second path, an electrical signal received at the electrical input is supplied to an optical source (e.g., a laser), which converts the electrical signal into a corresponding optical signal, for example, centered at the wavelength of one of the wavelength division multiplexed channels. The optical signal generated by the optical source is fed to and made available to optical output for receipt onto the optical fiber of the optical backbone 20.

The transmitter/receiver pair 71, 73 of optical components 40 (e.g., transceiver), according to the present invention, is tuned to a dedicated arbitration wavelength ($\lambda_A$) for both transmission onto the optical fiber, or the optical backbone 20, and for receiving arbitration information therefrom. The transmitter/receiver pair 81, 83 of optical components 50 (e.g., transceiver) includes a transmitter that is tunable to one of the plurality of WDM channels (e.g., centered at the wavelength of one of such channels).

In one embodiment, the optical receiver 83 of optical components 50 is tuned and set to a particular wavelength (i.e., the wavelength is fixed). For example, the data optical receiver of NIU0 may be fixed to $\lambda_0$, the data optical receiver of NIU1 may be fixed to $\lambda_1$, and the data optical receiver of NIU3 may be fixed to $\lambda_3$.

In another embodiment, the optical receiver of optical components 50 of one or more of the network interface units 12 may be tunable to one of a plurality of data wavelengths ($\lambda_0$-$\lambda_N$) for use in receiving information from another node of the plurality of nodes 14 of the optical communication system 10 transmitting at the wavelength. For example, in one or more embodiments, one node of the plurality of nodes 14 may be used to broadcast information to a plurality of nodes 14 during the same data cycle as each data optical receiver of the plurality of network interface units 12 would be able to tune to the same wavelength as being transmitted by the broadcast node. In other words, messages may be multicast to multiple nodes at the same time (e.g., during the same data cycle).

Further, in another embodiment, the data transmitter 81 may be fixed and the optical receiver 83 may be tunable to one of the plurality of WDM channels.

Figure 2A:
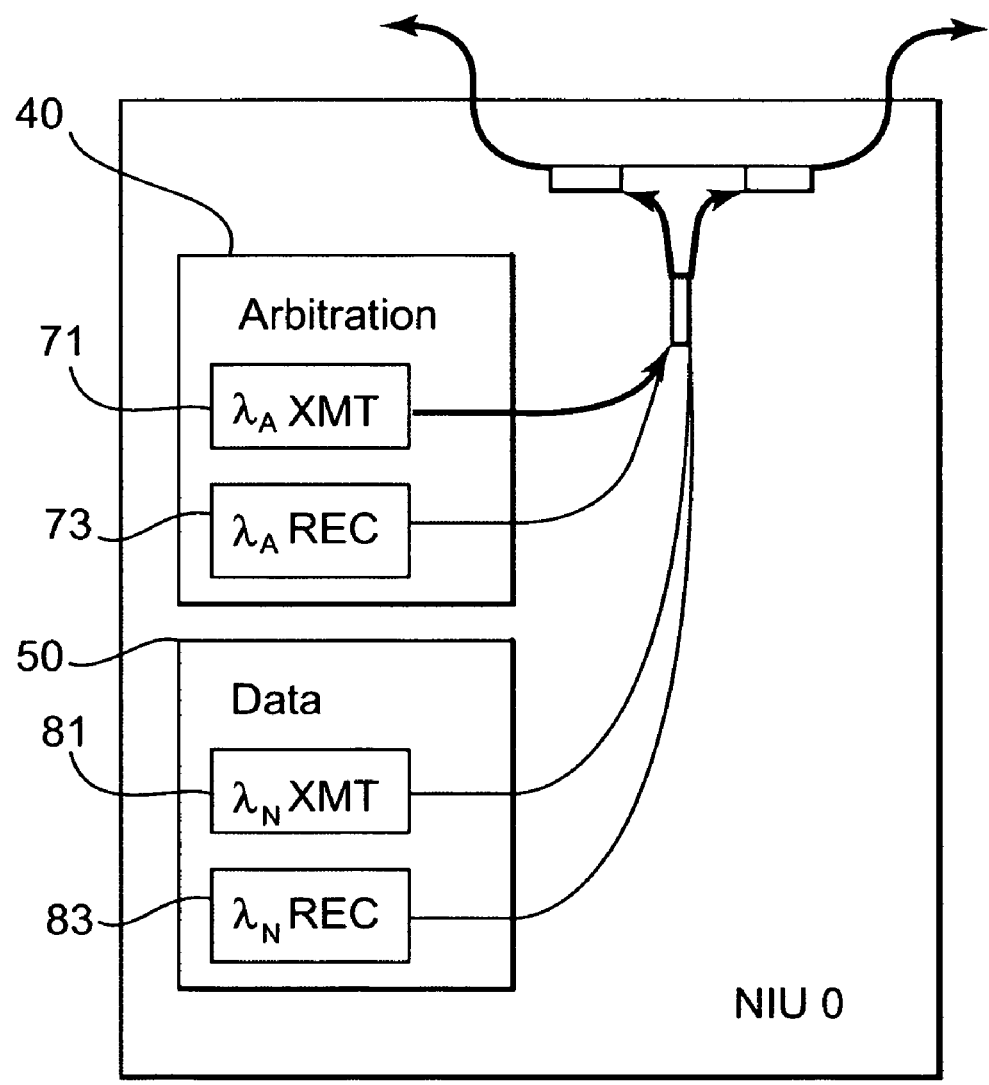
FIGS. 2A-2D show the communication of an optical signal to and/or from one of the network interface units, shown generally in FIG. 1, for use in illustrating the multi-channel capabilities of the optical communication system shown generally in FIG. 1.

FIGS. 2A-2D show an exemplary network interface unit NIU0 in a plurality of configurations to illustrate optical signal transmission or transport corresponding to operations performed in one or more arbitration and/or data cycles (e.g., concurrent data and arbitration cycles) during operation of the optical communication system 10 according to the present invention. For example, FIG. 2A shows transport of arbitration information by the bolded arrows during a request portion of an arbitration cycle at wavelength $\lambda_A$. As shown in FIG. 2A, arbitration optical transmitter 71 provides optical signal onto the optical fiber, and the signal is split for transport on the optical backbone 20.

Figure 2B:
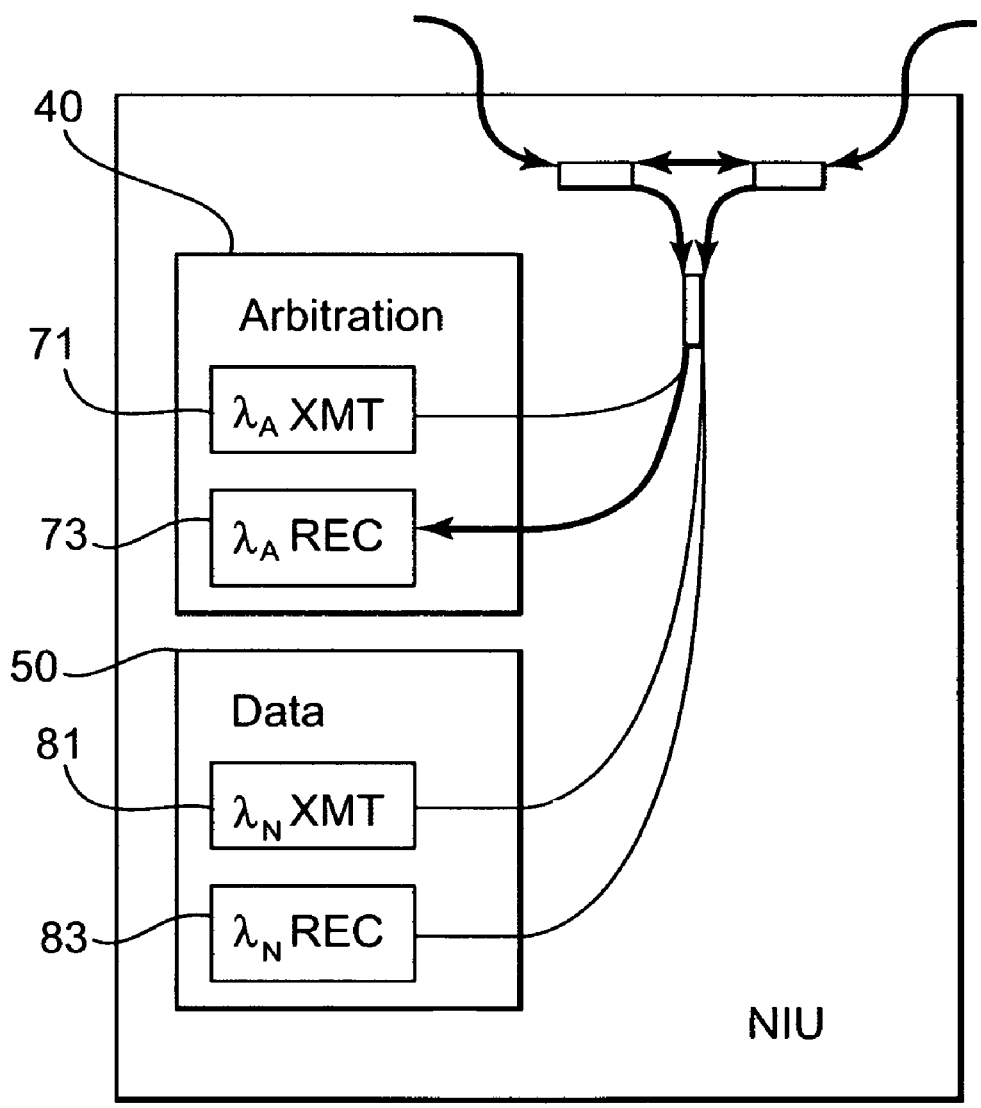
Figure 2C:
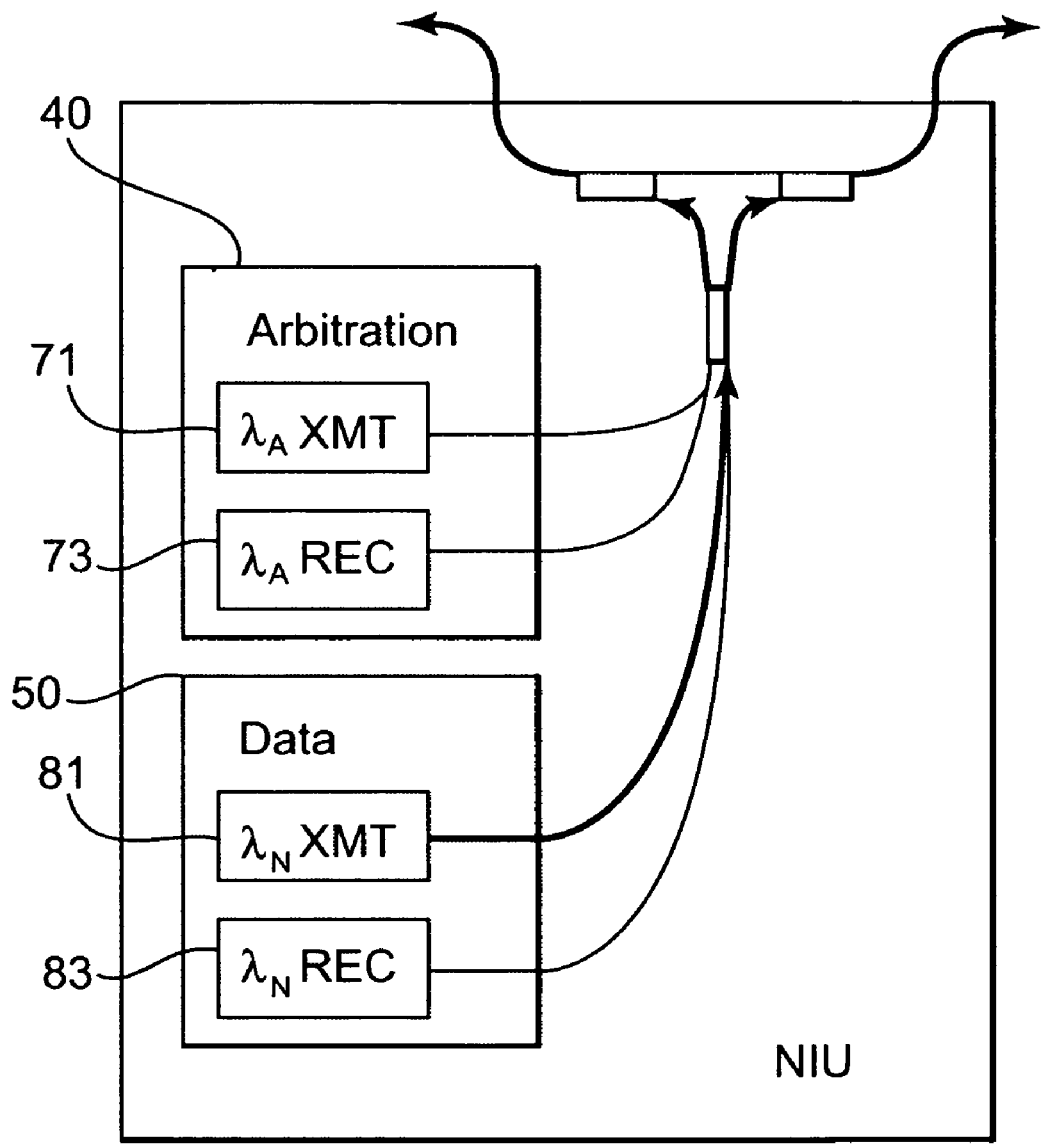
Figure 2D:
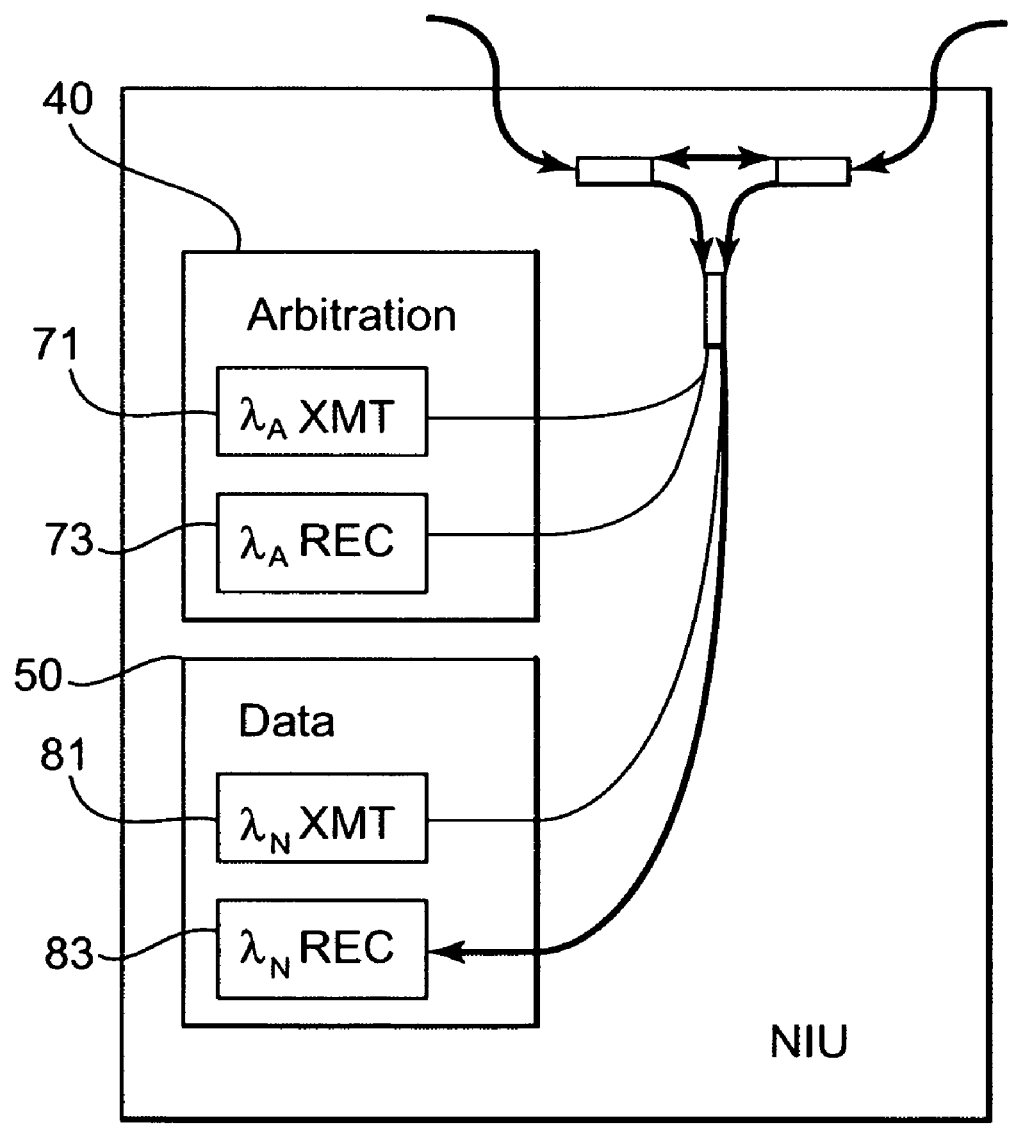

As shown in FIG. 2B, during an optional grant portion of the arbitration cycle, as will be described further herein, optical signal from the optical backbone 20 is combined and provided to the arbitration optical receiver 73 tuned to wavelength $\lambda_A$ (e.g., having a wavelength filter tuned to wavelength $\lambda_A$). Also, shown in FIG. 2B, each input signal is coupled to the other portion of the optical backbone to maintain the bidirectional bus connectivity. FIG. 2C shows the optical signal in bolded arrows upon a transmit from the data optical transmitter 81 during a data cycle of the present invention, and FIG. 2D shows the optical signal in bolded arrows during a data cycle when the node is receiving data at data optical receiver 83. Also, as shown in FIG. 2D, each signal is coupled to the other portion of the optical backbone to maintain the bidirectional bus connectivity. One will recognize that the implementation of such optical signal transport will differ depending upon the topology of the optical fiber backbone (e.g., unilateral versus bilateral, number of fibers, etc.).

Figure 3A:
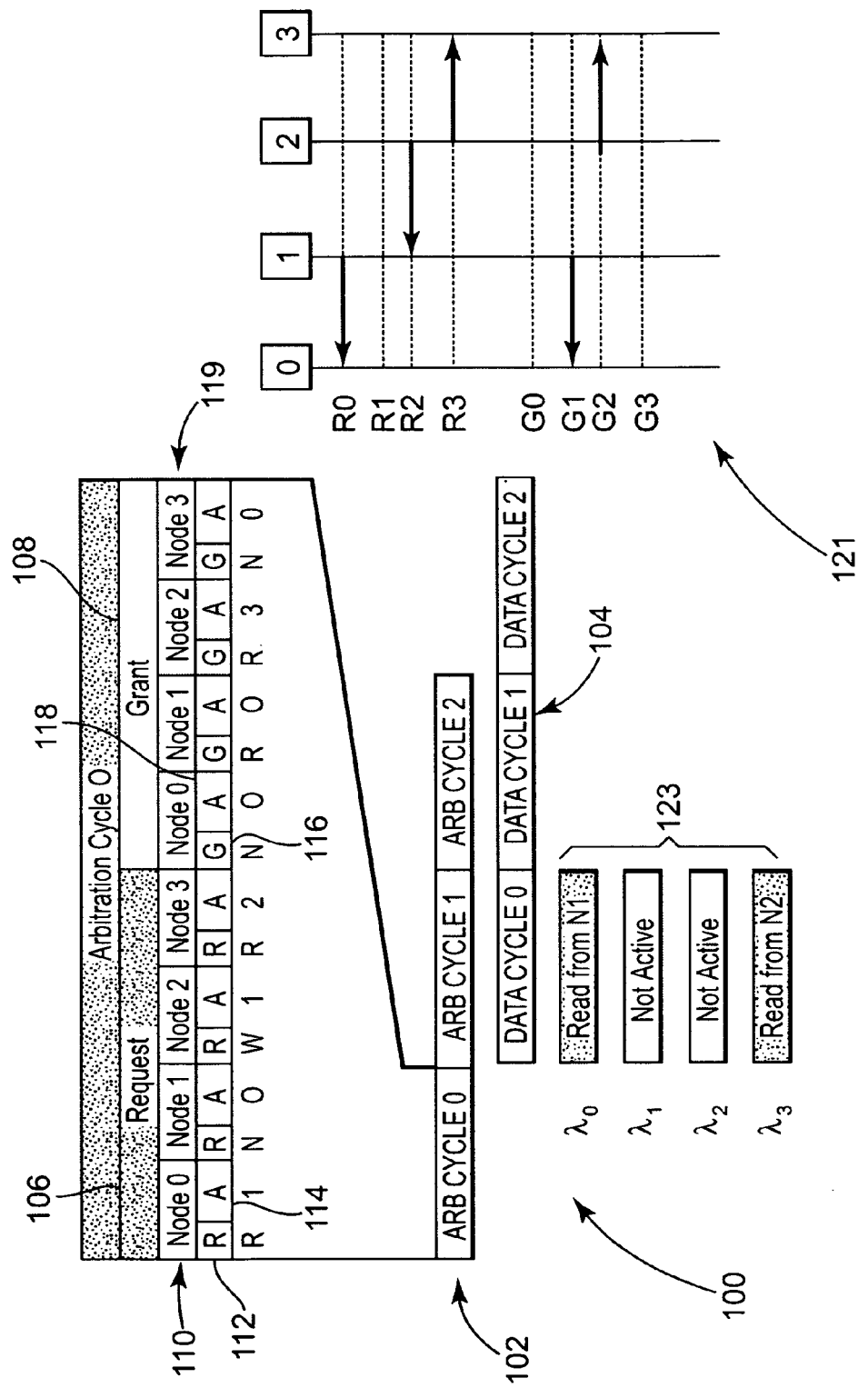
FIGS. 3A-3B show an exemplary embodiment of wavelength division multiplexed (WDM) optical channel switching according to the present invention using data cycles and arbitration cycles (e.g., that occur concurrently) with the use of time division multiplexing (TDM) being used for the arbitration cycle on a separate dedicated optical wavelength.
Figure 3B:
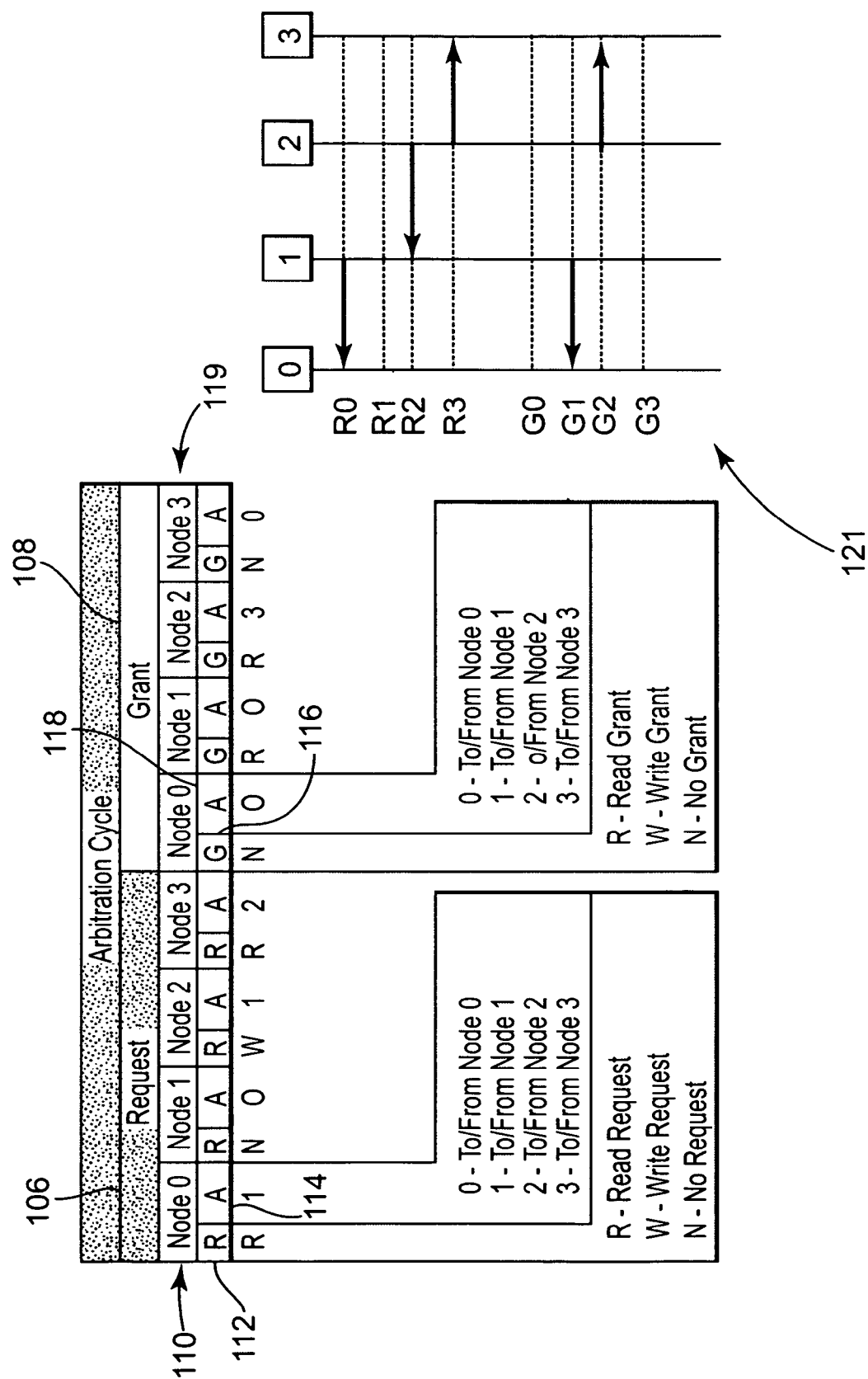

FIGS. 3A-3B shall be used to describe operation of the present invention over a plurality of concurrently employed data cycles 102 and arbitration cycles 104. A plurality of cycles 100 of operation are shown in FIG. 3A. As indicated herein, the arbitration cycles 102 and data cycles 104 run concurrently, with an arbitration cycle (e.g., a current arbitration cycle) determining the switch interconnections for transmission of data during a following or subsequent data cycle.

In other words, as shown in the plurality of cycles 100, arbitration cycle 0 occurs in a first time period, while the data cycle 0 (for which data transfer rights are determined in arbitration cycle 0) occurs during a second subsequent time period. Likewise, for example, arbitration cycle 1 occurs during the time period concurrent with data cycle 0, arbitration cycle 2 occurs concurrent with data cycle 1, and data cycle 2 occurs subsequent to a time period of arbitration cycle 2.

One will recognize that the arbitration cycles and data cycles overlap and run concurrently in the exemplary embodiment shown in FIG. 3A. However, one or more other embodiments may employ non-concurrently running arbitration and data cycles, as well. For example, other information transfers may be performed on the arbitration wavelength ($\lambda_A$) when a data cycle is carried out, or the data cycles may be carried out following and/or between arbitration cycles, but not concurrently. However, one will recognize that concurrent operation is allowed due to the arbitration wavelength ($\lambda_A$) being different than the wavelengths used for the WDM transmission of information during data cycles 104. Further, time division multiplexing of information from the various nodes during the arbitration cycle also permit such concurrent operation.

Arbitration cycle 0, which determines the communication of information during data cycle 0, is shown in further detail in FIGS. 3A and 3B. As shown therein, arbitration cycle 0, and each and every other arbitration cycle, includes at least a request portion 106. An optional grant portion 108 may or may not be necessary depending upon configuration of the plurality of nodes 14. For example, if each of the plurality of nodes 14 includes a substantially similar look-up table for determining the priorities of data transfer between the plurality of nodes 14, then each node will know exactly what communication is to take place during a data cycle upon analysis at each node of the arbitration information in the preceding arbitration cycle.

As such, the grant portion is either unnecessary or may be provided to carry out one or more other types of functionality. For example, the grant portion 108 may be used to confirm that the proper communication has been granted by the various nodes upon analysis of the arbitration information, the grant portion 108 may be used for confirmation of receipt of information by a node, or this portion of the arbitration cycle could be used to provide prognostic and health management information associated with the corresponding node. However, in the remainder of the exemplary operational description, both a request portion 106 and a grant portion 108 shall be employed in an arbitration cycle.

As shown in the exemplary request portion 106 of arbitration cycle 0 in FIGS. 3A-3B, time division multiplexing is used to provide arbitration information from each node of the plurality of nodes 14 of the optical communication system 10. In other words, each node is assigned a time slot 110 indicated by the designation Node 0, Node 1, Node 2, and Node 3 within the request portion 106.

Each node will monitor the arbitration wavelength ($\lambda_A$) and insert during the respective TDM time slot 110 both an action request (e.g., R) during a first portion 112 of the time slot 110 and information regarding the node it wishes to access (e.g., 1) during a second portion 114 of the time slot 110. As shown in FIG. 3B, for exemplary purposes, during the first time portion 112 of the time slot 110, R is equal to a read request, W is equal to a write request, and N is equal to no request. During the second portion 114 of the time slot 110, a 0 is representative of a write or read that is requested to or from node 0, a 1 is representative of a write or read that is requested to or from node 1, and so forth.

Likewise, the grant portion 108 of the arbitration cycle 0 also uses time division multiplexing of arbitration information from each of one or more of the plurality of nodes 14 on the communication system 10. For example, the time slots 119 are represented by the blocks within grant portion 108 indicated as Node 0, Node 1, Node 2, and Node 3.

Further, during the grant portion 108, at least in one embodiment, each node will insert during their respective TDM time slot 119 arbitration information indicative of that node's grant of a request to read or write from one or more of the other nodes. For example, time slot 119 is divided into first portion 116 for indication by the node of a read grant (R), a write grant (W), and no grant (N). The time slot 119 also includes a second portion 118 for receipt of arbitration information with respect to the node with which communication is desired. In other words, a 0 in second portion 118 is representative of the grant of a read or write to or from node 0, a 1 in the second portion 118 is representative of a read or write to or from node 1, and so forth.

As part of the exemplary request and grant portions 106 and 108 shown in FIG. 3B, a particular example of a switch interconnect dictated by such arbitration information shall be described with specific reference to the information contained within the time slots 110 and 119. Further, to such exemplary operation, the request portion 106 of arbitration cycle 0 indicates that node 0 is requesting a read from node 1 (R,1); that node 1 is making no request (N,0); that node 2 is requesting to write to node 1 (W,1); and node 3 is requesting a read from node 2 (R,2). Such requests are also shown graphically in graph 121 illustrated in both FIGS. 3A and 3B.

Upon analysis of the arbitration information in the request portion 106 of the arbitration cycle 0, each node makes a decision as to the communication amongst the various nodes. For example, as described previously herein, the decision may be made by the arbitration selection apparatus in the form of a look-up table, various logic implementations, etc. Such an analysis results in the information inserted into the TDM time slots 119 in grant portion 108 of the arbitration cycle 0. For example, as shown in FIGS. 3A and 3B, no grant is made by node 0 (N,0); node 1 grants a read by node 0 (R,0); node 2 grants a read by node 3 (R,3); and node 3 makes no grant (N,0).

In furtherance of this exemplary illustration, the granted requests carried out during data cycle 0 are shown in FIG. 3A as actions 123 and the grants are also shown in graph 121 of FIGS. 3A and 3B. In other words, the data optical receiver tuned to data wavelength $\lambda_0$ (the data optical receiver of NIU0) receives information transmitted via the data optical transmitter of network interface unit NIU1 corresponding to node 1 which is tuned to transmit at data wavelength $\lambda_0$. Likewise, the data optical receiver associated with network interface unit NIU3 tuned to wavelength $\lambda_3$ (e.g., may be fixed to this wavelength) receives information from the optical backbone 20 transmitted thereon via the data optical transmitter associated with network interface unit NIU2 tuned to transmit at wavelength $\lambda_3$. The other optical transmitters of the remaining nodes would not be active.

In other words, the arbitration cycle 0 accomplished the determination of the switch interconnect for data cycle 0. At the end of each arbitration cycle, the appropriate transmitters tune, for example, a laser transmitter to an appropriate wavelength for accomplishing the requested actions as determined during a prior arbitration cycle 0.

Figure 4:
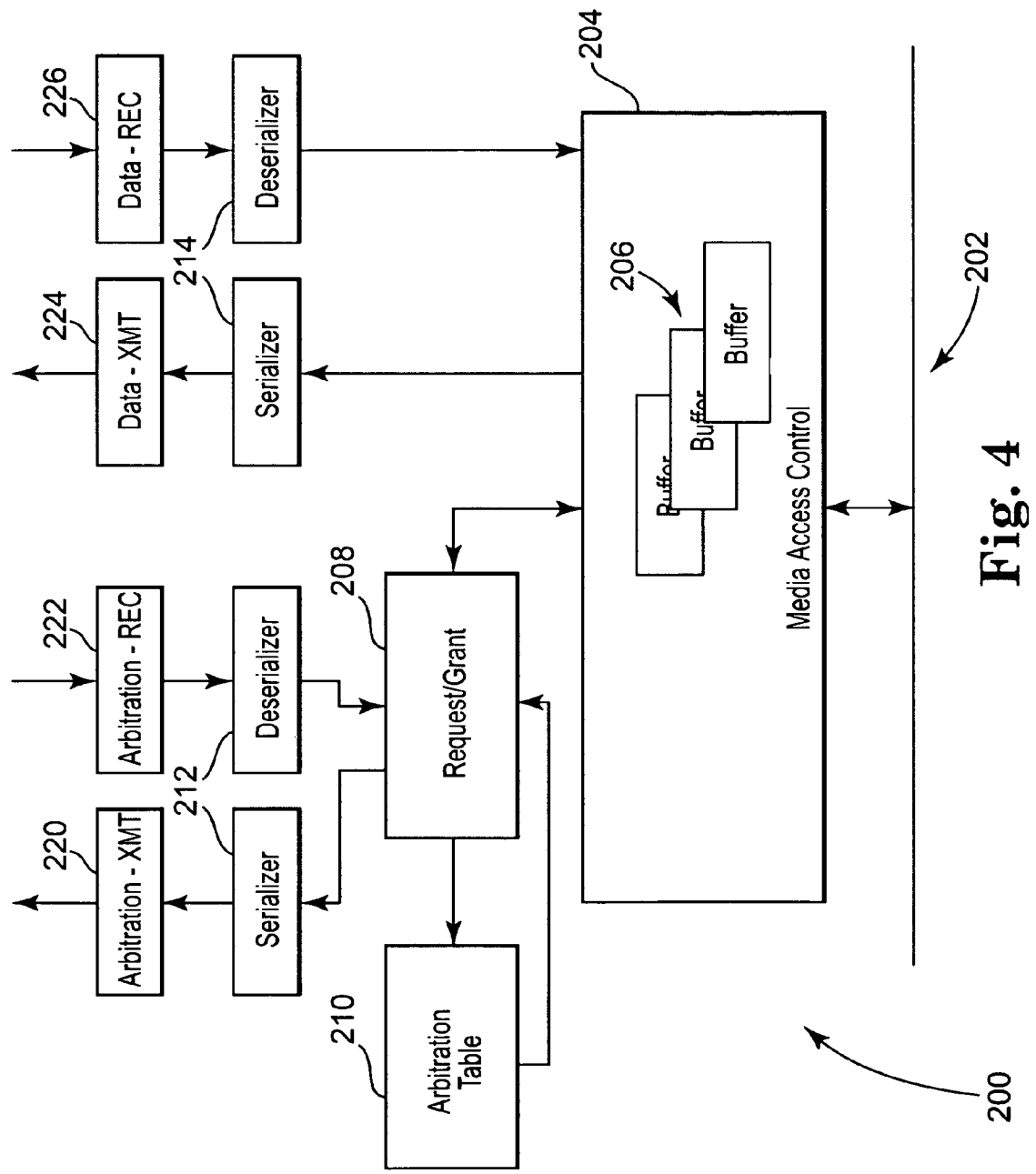
FIG. 4 shows a block diagram of one exemplary embodiment of a network interface unit, including an arbitration table, for use in controlling the communication of data between the network interface units at one or more nodes of an optical communication system, such as that shown in FIG. 1, according to the present invention.

FIG. 4 shows one exemplary embodiment of a network interface unit 200 in further detail than those previously described herein. One will recognize that the network interface unit may take one of various forms and generally is defined by a device that performs interface functions, such as, for example, code conversion, protocol conversion, and buffering required for communications to and from a network. For example, in one embodiment, the device may be used primarily to allow a number of independent devices with varying protocols to communicate with one another.

As shown in FIG. 4, the interface unit 200 is operatively coupled to an input/output (I/O) bus 202 (e.g., a peripheral component interconnect or interface (PCI)). The network interface unit 200 may further include a media access controller 204 for receiving data via the I/O bus 202. Further, the media access controller 204 is operable at the direction of request/grant analysis logic 208 to provide data (e.g., packetized information) to serializer/deserializer 214 and/or receive information from serializer/deserializer 214. The access controller 204 may include buffer 206 for use in providing and/or receiving and storing information provided thereto.

The request/grant analysis logic 208 of the NIU 200 provides for analyze of arbitration information. For example, arbitration information is transmitted during arbitration cycles by arbitration transmitter 220 upon receipt of such information from serializer/deserializer 212. Further, as described herein, arbitration information is time division multiplexed during the arbitration cycles from other nodes. The TDM arbitration information is received via optical receiver 222 and provided to request/grant analysis logic 208 via serializer/deserializer 212.

Request/grant analysis logic 208 requests and/or receives information from arbitration table 210 based on the arbitration information received via optical receiver 222, and appropriate commands are provided by the request/grant analysis logic 208 (e.g., software and/or hardware implemented) to media access controller 204 for commanding transmission of data during data cycles using data optical transmitter 224 of the network interface unit 200. Data transmitted to a node is then received by data optical receiver 226 of the network interface unit 200 and provided to media access controller 204 via serializer/deserializer 214. The data may then be communicated as desired via input/output 202.

One skilled in the art will recognize that various components of the network interface unit may be implemented in many different manners and that FIG. 4 provides just one exemplary configuration of a generalized network interface unit configuration according to the present invention. The present invention is limited in no manner to the components shown and/or described with reference to FIG. 4.

All patents and references cited herein are incorporated in their entirety as if each were incorporated separately. This invention has been described with reference to illustrative embodiments and is not meant to be construed in a limiting sense. As described previously, one skilled in the art will recognize that various other illustrative exemplary network interface units may be provided which utilize various combinations of the elements described herein and/or are suitable for carrying out the functionality described herein. Various modifications of the illustrative embodiments, as well as additional embodiments of the invention and combinations of various elements and/or steps herein, will be apparent to persons skilled in the art upon reference to this description. It is therefore contemplated that the patented claims will cover any such modifications or embodiments that may fall within the scope of the present invention as defined by the accompanying claims.

What is claimed is:

1. An optical communication system for use in communicating data between a plurality of nodes using wavelength division multiplexing, the communication system comprising:

an optical backbone to provide an optical pathway between the plurality of nodes, wherein the optical backbone is a bidirectional optical backbone; and a plurality of network interface units, each network interface unit associated with a corresponding node of the plurality of nodes, wherein each network interface unit comprises:
- an arbitration optical transmitter operable to transmit arbitration information on the optical pathway at an arbitration wavelength during an arbitration cycle representative of at least a request to write data to or read data from another node of the plurality of nodes, wherein the arbitration information is bidirectionally transmitted onto the optical pathway from the network interface unit;
- an arbitration optical receiver tuned to the arbitration wavelength to receive transmitted arbitration information from the optical pathway during an arbitration cycle from one or more of the plurality of nodes, wherein transmitted arbitration information is received bidirectionally by the network interface unit from the optical pathway;
- a data optical transmitter tunable to a plurality of wavelengths for use in transmitting data on the optical pathway to another node of the plurality of nodes, the plurality of wavelengths being different than the arbitration wavelength, wherein the data is bidirectionally transmitted onto the optical pathway from the network interface unit;
- a data optical receiver tunable to one of the plurality of wavelengths for use in receiving data from the optical pathway, wherein data is received bidirectionally by the network interface unit from the optical pathway; and
- an arbitration selection apparatus operable to analyze the transmitted arbitration information of an arbitration cycle from a plurality of nodes, select a wavelength of the plurality of wavelengths at which to transmit data to another node during a data cycle based on the transmitted arbitration information of the arbitration cycle, and change the wavelength to another wavelength of the plurality of wavelengths at which to transmit data to another node during another data cycle based on transmitted arbitration information of another arbitration cycle.

2. The system of claim 1, wherein arbitration cycles run concurrently with data cycles, and further wherein arbitration information from each arbitration cycle is used to control data transmission in a data cycle subsequent to the arbitration cycle.

3. The system of claim 1, wherein the arbitration information from each of a plurality of arbitration optical transmitters associated with a plurality of nodes is time division multiplexed at the arbitration wavelength during the arbitration cycle.

4. The system of claim 1, wherein each arbitration optical transmitter is operable to transmit arbitration information on the optical pathway at the arbitration wavelength during an arbitration cycle representative of a request to write data to or read data from another node of the plurality of nodes and also transmit arbitration information on the optical pathway at the arbitration wavelength during the arbitration cycle representative of a grant of a request to write data to or read data from another node of the plurality of nodes.

5. The system of claim 4, wherein arbitration information from each of a plurality of arbitration optical transmitters associated with a plurality of nodes and representative of a request to write data to or read data from another node is time division multiplexed at the arbitration wavelength during a first portion of the arbitration cycle, and further wherein arbitration information from each of a plurality of arbitration optical transmitters associated with a plurality of nodes and representative of grant of a request to write data to or read data from another node is time division multiplexed at the arbitration wavelength during a second portion of the arbitration cycle.

6. The system of claim 1, wherein each arbitration optical transmitter is operable to transmit arbitration information on the optical pathway at the arbitration wavelength during an arbitration cycle representative of a request to write data to or read data from another node of the plurality of nodes and also transmit arbitration information on the optical pathway at the arbitration wavelength during the arbitration cycle representative of a confirmation of the data read or write at the plurality of nodes.

7. The system of claim 1, wherein each of the data optical receivers associated with a plurality of nodes is tuned and set to a different designated data receive wavelength of the plurality of wavelengths.

8. The system of claim 1, wherein the arbitration selection apparatus of each network interface unit comprises substantially identical selection logic for determining priority for transmission of data amongst the plurality of nodes.

9. The system of claim 8, wherein the selection logic comprises a lookup table usable for determining priority amongst the plurality of nodes.

10. A switching method for use in optically communicating data between a plurality of nodes, wherein a bidirectional optical backbone provides an optical pathway between the plurality of nodes, wherein data is communicated between the plurality of nodes using wavelength division multiplexing, the method comprising:
- bidirectionally transmitting arbitration information onto the optical pathway, from each node of a plurality of nodes, at an arbitration wavelength during an arbitration cycle representative of at least a request to write data to or read data from another node of the plurality of nodes;
- receiving the transmitted arbitration information at each node during the arbitration cycle from the plurality of nodes;
- selecting, at each of one or more of the plurality of nodes, a transmission wavelength of a plurality of wavelengths at which to transmit data to one or more other nodes based on the transmitted arbitration information, wherein the plurality of wavelengths are different than the arbitration wavelength;
- bidirectionally transmitting data onto the optical pathway, from each of one or more nodes to another node of the plurality of nodes, at a selected transmission wavelength during a data cycle;
- receiving transmitted data at each of one or more nodes tuned to a selected transmission wavelength; and
- changing the selected transmission wavelength to another wavelength of the plurality of wavelengths for transmitting data onto the optical pathway to another node during another data cycle based on transmitted arbitration information of another arbitration cycle.

11. The method of claim 10, wherein arbitration cycles run concurrently with data cycles, and further wherein arbitration information from each arbitration cycle is used to control data transmission in a data cycle subsequent to the arbitration cycle.

12. The method of claim 10, wherein transmitting arbitration information at an arbitration wavelength during an arbitration cycle comprises time division multiplexing arbitration information from each node of a plurality of nodes at the arbitration wavelength during the arbitration cycle.

13. The method of claim 10, wherein transmitting arbitration information at an arbitration wavelength during an arbitration cycle comprises transmitting arbitration information at the arbitration wavelength during an arbitration cycle representative of a request to write data to or read data from another node of the plurality of nodes and also transmitting arbitration information at the arbitration wavelength during the arbitration cycle representative of a grant of a request to write data to or read data from another node of the plurality of nodes.

14. The method of claim 13, wherein transmitting arbitration information at an arbitration wavelength during an arbitration cycle representative of a request to write data to or read data from another node of the plurality of nodes comprises time division multiplexing arbitration information from each of a plurality of nodes at the arbitration wavelength during a first portion of an arbitration cycle, and further wherein transmitting arbitration information at the arbitration wavelength during the arbitration cycle representative of a grant of a request to write data to or read data from another node of the plurality of nodes comprises time division multiplexing arbitration information from each of a plurality of nodes representative at the arbitration wavelength during a second portion of the arbitration cycle.

15. The system of claim 10, wherein transmitting arbitration information at an arbitration wavelength during an arbitration cycle comprises transmitting arbitration information at the arbitration wavelength during an arbitration cycle representative of a request to write data to or read data from another node of the plurality of nodes and also transmitting arbitration information at the arbitration wavelength during the arbitration cycle representative of a confirmation of the data read or write at the plurality of nodes.

16. The method of claim 10, wherein receiving transmitted data at each of one or more nodes at the selected wavelengths comprises tuning and setting a data optical receiver associated with each node to a designated data receive wavelength of the plurality of wavelengths.

17. The method of claim 10, wherein selecting, at each of one or more of the plurality of nodes, a transmission wavelength of a plurality of wavelengths comprises analyzing the transmitted arbitration information using selection logic substantially identical at each node for determining priority for transmission of data amongst the plurality of nodes.

18. An optical communication system for use in communicating data between a plurality of nodes using wavelength division multiplexing, the communication system comprising:

an optical backbone to provide an optical pathway between the plurality of nodes, wherein the optical backbone is a bidirectional optical backbone;

arbitration optical transmitter means, at each node, for transmitting arbitration information on the optical pathway at an arbitration wavelength during an arbitration cycle representative of at least a request to write data to or read data from another node of the plurality of nodes, wherein the arbitration information is bidirectionally transmitted onto the optical pathway from the node;

arbitration optical receiver means, at each node, tuned to the arbitration wavelength for receiving transmitted arbitration information from the optical pathway during the arbitration cycle from one or more of the plurality of nodes, wherein transmitted arbitration information is received bidirectionally by the node from the optical pathway;

data optical transmitter means tunable to a plurality of wavelengths for transmitting data on the optical pathway to another node of the plurality of nodes, the plurality of wavelengths being different than the arbitration wavelength, wherein the data is bidirectionally transmitted onto the optical pathway from the node;

data optical receiver means tunable to one of the plurality of wavelengths for use in receiving data from the optical pathway, wherein data is received bidirectionally by the node from the optical pathway; and selection means, at each node, operable to analyze the transmitted arbitration information of an arbitration cycle from a plurality of nodes, select a wavelength of the plurality of wavelengths at which to transmit data to another node during a data cycle based on the transmitted arbitration information of the arbitration cycle, and change the wavelength to another wavelength of the plurality of wavelengths at which to transmit data to another node during another data cycle based on transmitted arbitration information of another arbitration cycle.

19. The system of claim 18, wherein the arbitration optical transmitter means comprises means for time division multiplexing arbitration information from each of a plurality of nodes at the arbitration wavelength during the arbitration cycle.

* * * * *